United States Patent [19]

Hedstrom

[11] Patent Number: 5,211,071
[45] Date of Patent: May 18, 1993

[54] MODULAR BRAKE SYSTEM ASSEMBLY PROCEDURE

[75] Inventor: Kristen K. Hedstrom, Romeo, Mich.

[73] Assignee: Handy & Harman Automotive Group, Auburn Hills, Mich.

[21] Appl. No.: 855,181

[22] Filed: Mar. 20, 1992

Related U.S. Application Data

[63] Continuation-in-part of Ser. No. 822,801, Jan. 21, 1992.

[51] Int. Cl.$^5$ .................................................. F16C 1/22
[52] U.S. Cl. ........................... 74/501.5 R; 74/501.6; 74/502; 29/437; 29/439
[58] Field of Search ............ 74/501.5 R, 501.6, 502.2, 74/502, 502.4; 188/112 R, 2 D; 29/433, 437, 439

[56] References Cited

U.S. PATENT DOCUMENTS

| | | | |
|---|---|---|---|
| 1,950,976 | 3/1934 | Dodge | 74/39 |
| 2,787,917 | 4/1957 | Schroeder | 74/502 |
| 2,821,091 | 1/1958 | Benner | 74/482 |
| 4,020,713 | 5/1977 | Cantley et al. | 74/479 |
| 4,174,099 | 11/1979 | Yamasaki | 74/501.5 R X |
| 4,412,458 | 11/1983 | Derringer | 74/502.4 X |
| 4,553,626 | 11/1985 | Kazmierczak | 180/307 |
| 4,588,200 | 5/1986 | Kanamori | 74/502 X |
| 4,850,241 | 7/1989 | Buckley et al. | 74/502.2 OR |
| 4,914,971 | 4/1990 | Hinkens et al. | 74/501.5 R X |
| 5,016,490 | 5/1991 | Jaksic | 74/501.5 R OR |
| 5,080,434 | 1/1992 | Locher | 74/501.5 A X |
| 5,086,662 | 2/1992 | Tayon et al. | 74/501.5 R OR |
| 5,131,288 | 7/1992 | Barlas | 74/501.5 R X |
| 5,144,856 | 9/1992 | Roca | 74/501.5 R OR |

Primary Examiner—Leslie A. Braun
Assistant Examiner—Daniel Wittels
Attorney, Agent, or Firm—Pennie & Edmonds

[57] ABSTRACT

The present invention relates to a method for assembling a modular brake system on a vehicle by the steps of preparing a reactive slide member having pins to facilitate reciprocal movement and a bore therein for receiving a cable strand; operatively associating a first cable conduit having a first cable strand disposed therein with the reactive slide member such that the first cable strand can slidably move through the conduit and reactive slide member; preparing a housing having inner walls which define a cavity, an opening for receiving the slide member, openings for allowing cable strands to enter or exit the cavity and channels on the inner walls for receiving the pins of the reactive slide member; affixing a second cable conduit to one of the openings of the housing for receiving a cable strand which exits the housing cavity through that opening; preparing a third cable conduit having a third cable strand slidably disposed therein; placing the reactive slide member into the housing through its respective housing opening; passing a first end of the first cable strand from the reactive slide member through a housing opening and into the second cable conduit; attaching a first end of the third cable strand to the reactive slide member; and configuring the first end of the first cable strand and a second end of the third cable strand for transmitting forces to first and second vehicle brakes, respectively. The invention also relates to a modular brake system which is provided by the heretofore described assembly method.

30 Claims, 8 Drawing Sheets

MODULAR BRAKE SYSTEM ASSEMBLY PROCEDURE

CROSS REFERENCE TO RELATED APPLICATIONS

This application is a continuation-in-part of application Ser. No. 07/822,801, filed Jan. 21, 1992.

FIELD OF THE INVENTION

This invention relates to an assembly process for making modular brake systems, and to the product assembled by the process. The design of the system allows a unique assembly process requiring a minimum number of steps to reduce the cost of installing the product.

BACKGROUND ART

The use of lever actuated strands to set brakes is known in the art. Strands may act between two fixed points to impart a force to actuate brake drums or calipers when one end is pulled by a setting lever that may be hand or foot activated. Sheathed strands, or cables, may be used in a similar fashion with the advantage that the strand itself is protected. Both implementations rely upon an actuating hand or foot mechanism and commonly employ a bracket joining two brake strands so that they may be commonly actuated to impart uniform brake force to a drum or caliper. This construction requires that the assembly to achieve this either be housed within the vehicle to protect it from weathering or, in the alternative, be disposed beneath the vehicle where it is exposed to weathering.

It is desirable to have a simplified brake system that is easily assembled to a motor vehicle and has the features of simplicity and weather resistance. It is also desirable to design the component parts of the modular brake assembly to facilitate the efficient assembly of the components. By doing so, the cost of producing the product is minimized. The brake systems heretofore have not achieved these results.

SUMMARY OF THE INVENTION

The present invention relates to a method for assembling a modular brake system on a vehicle by the steps of preparing a reactive slide member having means to facilitate reciprocal movement and a bore therein for receiving a cable strand; operatively associating a first cable conduit having a first cable strand disposed therein with the reactive slide member such that the first cable strand can slidably move through the conduit and reactive slide member; preparing a housing having inner walls which define a cavity, an opening for receiving the slide member, openings for allowing cable strands to enter or exit the cavity and means on the inner walls for receiving the reciprocal movement means of the reactive slide member; affixing a second cable conduit to one of the openings of the housing for receiving a cable strand which exits the housing cavity through that opening; preparing a third cable conduit having a third cable strand slidably disposed therein; placing the reactive slide member into the housing through its respective housing opening; passing a first end of the first cable strand from the reactive slide member through a housing opening and into the second cable conduit; attaching a first end of the third cable strand to the reactive slide member; and configuring the first end of the first cable strand and a second end of the third cable strand for transmitting forces to first and second vehicle brakes, respectively.

In this method, one end of the first cable conduit may be attached to the reactive slide member to form an actuating cable subassembly and one end of the second cable conduit may be attached to the housing to form a modular housing subassembly prior to placing the reactive slide member into the housing. Also, the method may further include providing the reactive slide member with means for guiding the first cable conduit thereto.

It is advantageous to configure the openings of the housing so that the first and second cable strands are in parallel alignment. In addition, the method preferably further comprises providing an end button on the first end of the second cable strand, providing a recess in the reactive slide for receiving the end button of the second cable strand and configuring the geometry of the housing to direct the end button into the recess as it passes into the housing.

The final step in the method is the attachment of the first end of the first cable strand and the second end of the third cable strand to the first and second vehicle brakes, respectively. If desired, one or more jumper strands for connection to either the first end of the first cable strand or the second end of the third cable strand, or both, may be provided for adjusting the length of such strands prior to connection to the first and second vehicle brakes, respectively. For cosmetic purposes, one or more of the first, second and third cable conduits, as well as the housing, may be attached to the vehicle.

To prevent the entry of contaminants into the housing cavity, the first cable conduit may be sealed to the housing. This would enable the assembly to provide a hong period of service without deterioration of performance.

Finally, the invention also relates to a modular brake system which is provided by the heretofore described assembly method.

BRIEF DESCRIPTION OF THE DRAWINGS

Structural characteristics of the modular brake system of the present invention and its operational features and assembly process will become apparent from the ensuing detailed description, particularly when read with reference to the following drawing figures which illustrate preferred embodiments of the device and wherein.

DETAILED DESCRIPTION OF THE INVENTION

As noted above, the present invention relates to an assembly process for making modular brake systems, and to the product made by this process. To the extent necessary to more fully appreciate the benefits and features of the product, the disclosure of co-pending application Ser. No. 07/822,801, filed Jan. 21, 1992, is expressly incorporated herein by reference thereto.

Figure 1:
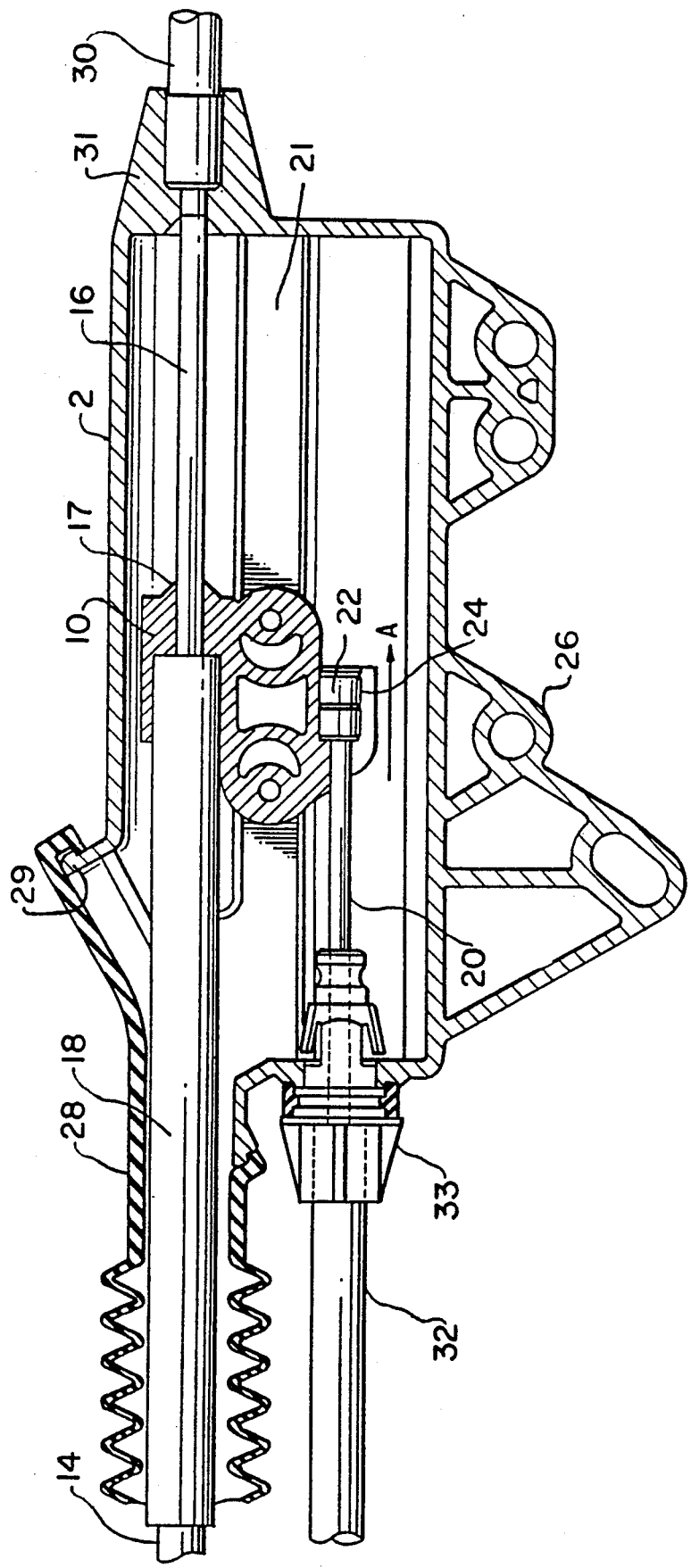
FIG. 1 is a cross section of the assembled modular brake housing of the invention including a reactive slide member mounted therein, with actuating and control attached thereto.

FIG. 1 illustrates the modular brake system of the invention in side cross-section. A brake actuator, mounted in the cab of the vehicle, is connected to the housing 2 by a combined actuator and control cable that has a conduit 14, guide tube 18 and inner strand 16. This combined actuator and control cable exits the housing 2 as control cable conduit 30 and connects to the right rear brake to provide an actuating means for engaging the brake. A second control cable conduit 32 having strand 20 is connected between the housing 2 and the left rear brake to provide an actuating means for that brake.

Figure 2:
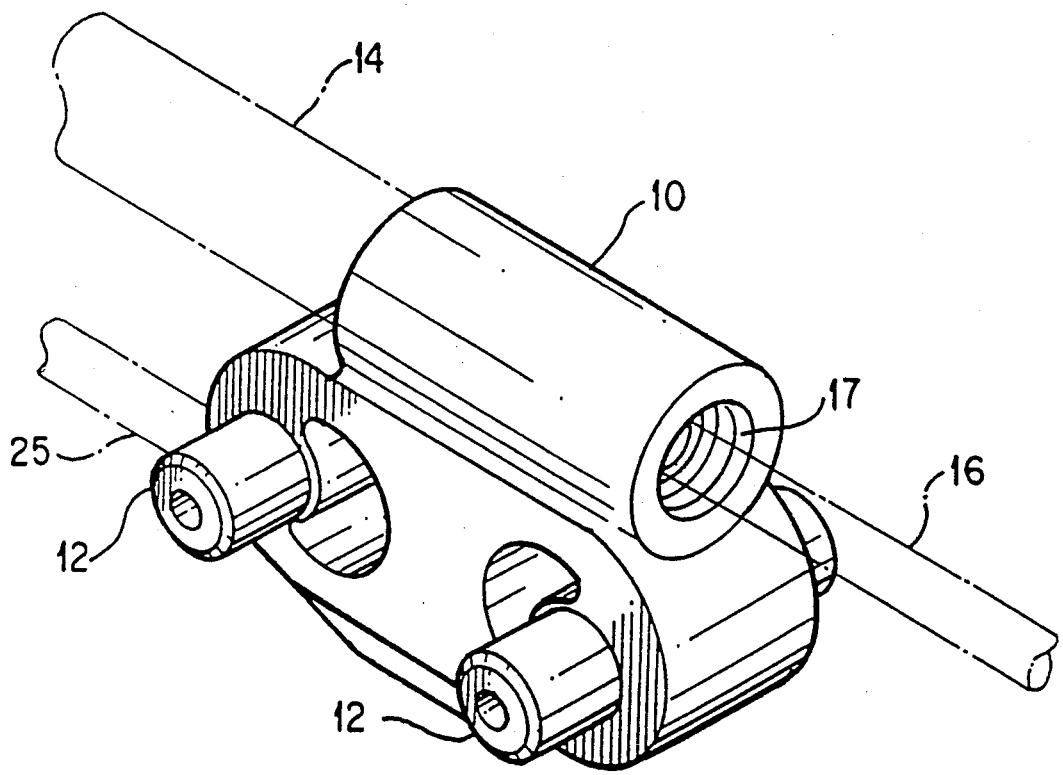
FIG. 2 is a perspective view of the reactive slide member device.

FIG. 2 shows a perspective of a reactive slide member 10 for use in the system. Either attached or molded onto the reactive slide 10 are four pins 12 that are used to slideably mount the reactive slide member 10 in channels 21 in the housing 2 (shown in FIG. 4) to allow it to slide longitudinally within the housing 2. The actuator and control cable conduit 14 is attached to the one side of the reactive slide member 10. The actuator and control cable strand 16 is slidable disposed within conduit 14, guide tube 18, and barrel 17 of reactive slide member 10, and is then connected to the right rear brake mechanism through control conduit 30. This barrel 17, which is preferably cast as part of the reactive slide member, may also be constructed to have a nipple extending from the orifice to guide strand 16.

Figure 3:
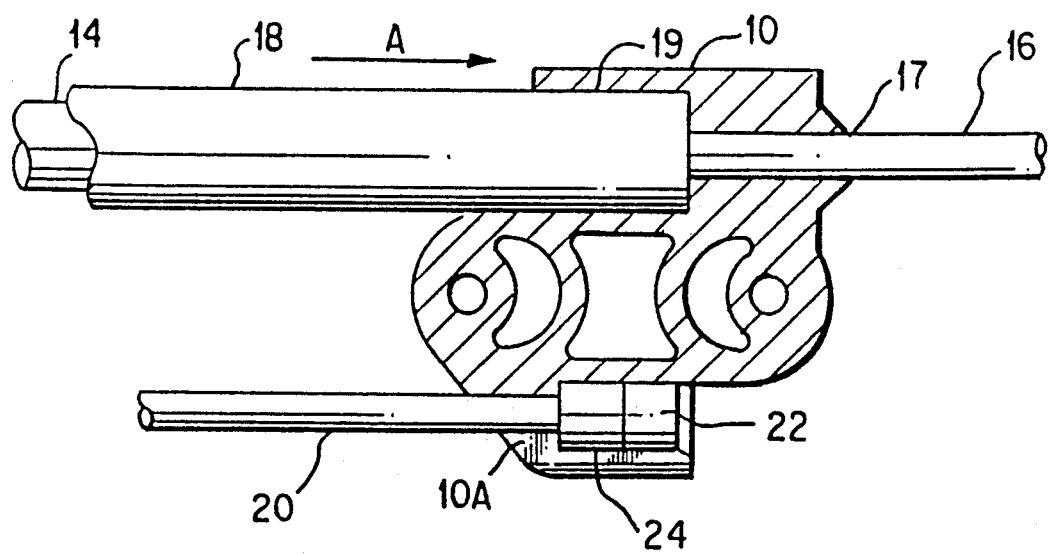
FIG. 3 is a side cross sectional view of the reactive of FIG. 2.

FIG. 3 is a cross section of the reactive slide member 10 showing the positioning of the actuator and control conduit 14 enclosed within the guide tube 18 which is crimped onto the cast orifice 19 of reactive slide member 10. Various means of attachment, such as the compression fitting of the crimped guide tube 18 into orifice 19, may be used to make this connection. This results in the conduit 14 being firmly attached to the reactive slide 10. This view also shows that strand 16 of the actuator and control cable slides within the barrel 17 of the reactive slide member 10.

The second control cable strand 20 is attached to the bottom portion 10A of the reactive slide 10 by a button 22 formed on the end of the strand 20 which is engaged in a cast recess 24 in the bottom portion 10A of the reactive slide member 10. This second control cable strand 20 is located in the same hemisphere of a generally common plane with the reactive slide member 10 as is the connection to the housing 2 of the actuator and control conduit 14.

Figure 4:
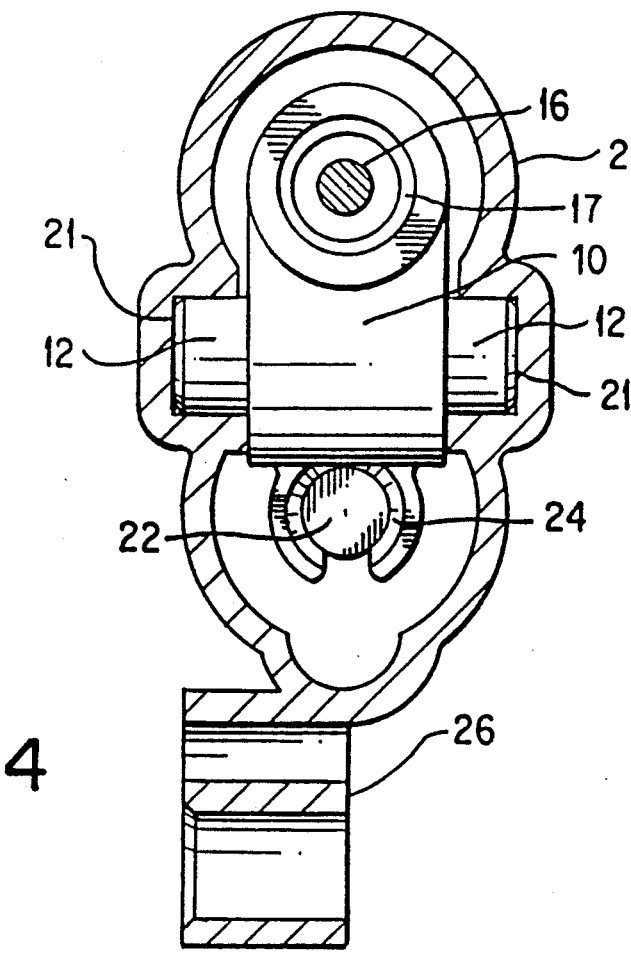
FIG. 4 is a front cross sectional view of the reactive slide f FIG. 2 mounted in the housing of FIG. 1.

FIG. 4 is an end cross section of the modular brake system housing 2 showing in greater detail the position of the reactive slide pins 12 of the reactive slide 10 in the housing channels 21. Also shown is a button 22 Which is attached to the second control strand 20 lodged in a cast recess 24 of the reactive slide 10. The housing 2 also has a mounting bracket 26 that provides for easy attachment to the axle or frame of a motor vehicle.

In order to assemble this modular brake system, the control cable subassembly 100, modular housing subassembly 200 and actuating cable subassembly 300 are first prepared. These subassemblies are further illustrated in FIGS. 5, 6 and 7.

Figure 5:
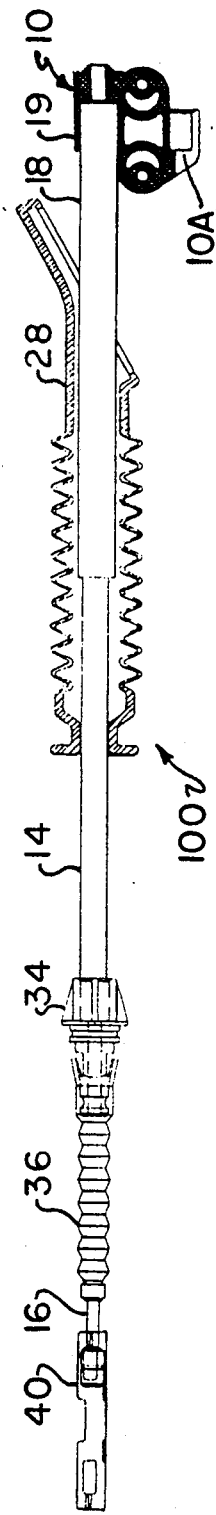
FIG. 5 a side view, partially in cross-section, of a control cable subassembly for use in the method and system of the present invention.

FIG. 5 illustrates the control cable subassembly 100. This subassembly is prepared by first preparing a reactive slide member 10 with the features discussed above with regard to FIGS. 2 and 3, and then connecting guide tube 18 to reactive slide orifice 19, followed by sliding boot 28 onto cable 14. Next, the end of guide tube 18 is inserted into barrel 17 of reactive slide member 10 to be attached thereto.

Figure 6:
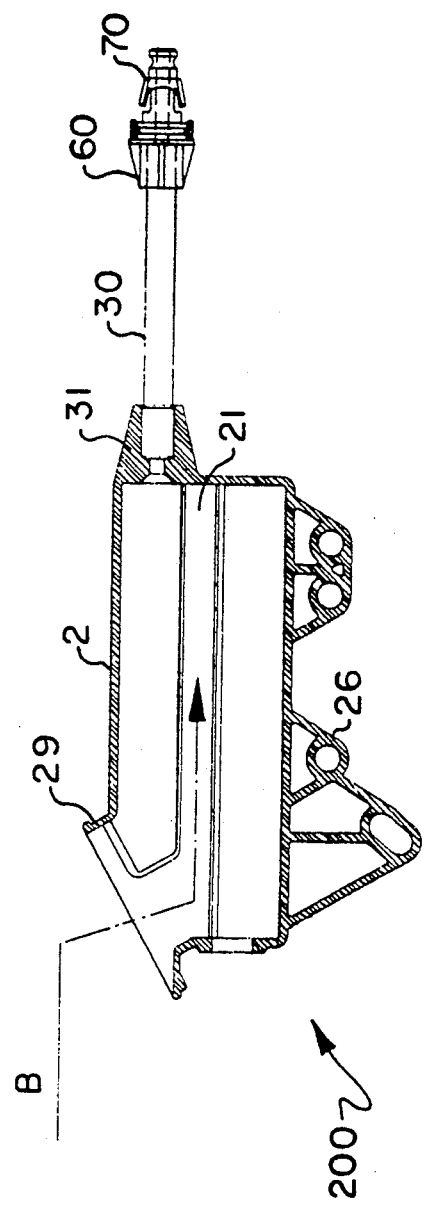
FIG. 6 is a side view, partially in cross-section, of a module housing subassembly for use in the method system of the present invention.

The assembly of the modular housing subassembly 200 is illustrated in FIG. 6. Housing 2 is prepared having the features described above, by injection molding for example, and control conduit 30 is then connected to a receiving cavity located at an end 31 of the housing 2. This connection is made by a compression fitting of the end of the conduit 30 into the cavity. If desired, an adhesive can be used to make the joint more secure. The opposite end of the control conduit 30 includes an end fitting 60 which has a connection member 70 for attaching the end of strand 16 to the first vehicle brake.

Figure 7:
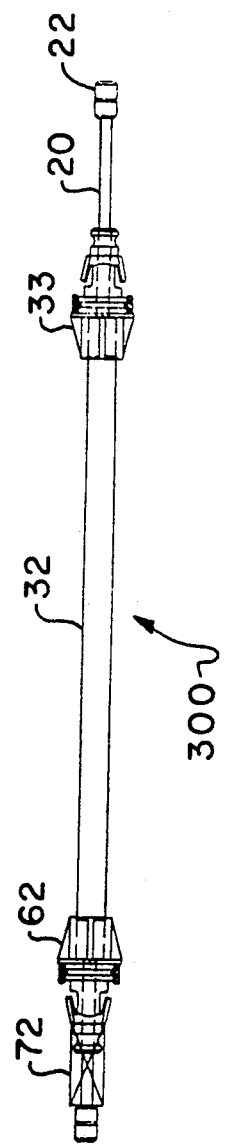
FIG. 7 is a side view of an actuating cable subassembly in the method and system of the present invention.

FIG. 7 shows the preparation of the actuating cable subassembly 300, which includes control cable conduit 32, end connector 33, strand 20 and end button 22. End connector 33 is attached to a housing aperture which is provided below conduit 14 and which is positioned so that conduit 32 is substantially parallel to conduit 14. The opposite end of cable conduit 32 includes an end fitting 62 which has a connection member 72 for attaching the end of strand 20 to the second vehicle brake.

Next, the reactive slide member 10 of the control cable subassembly 100 is placed into the channels 21 of the module housing subassembly 200 in the direction of arrow B as shown in FIG. 6. The reactive slide 10 slides into the housing 2 through the left side opening of housing 2. The pins 12 of reactive slide 10 engage the channels 21 of the housing 2 to thus slideably mount the reactive slide member 10 therein. The flexible boot 28 slides over the guide tube 18 and is snapped over a lip 29 on the left side opening of the housing 2 to create a moisture seal therewith. The actuator and control strand 16 that slides within the conduit 14 and guide tube 18 and barrel 17 of reactive slide 10 is pushed therethrough to exit the housing 2 through first control conduit 30 to its connection with end connector 70, which is, in turn, connected to the first brake assembly. Thereafter, the reactive slide member 10 is placed at the right hand side of the module housing subassembly 100, as shown in FIG. 8.

Figure 8:
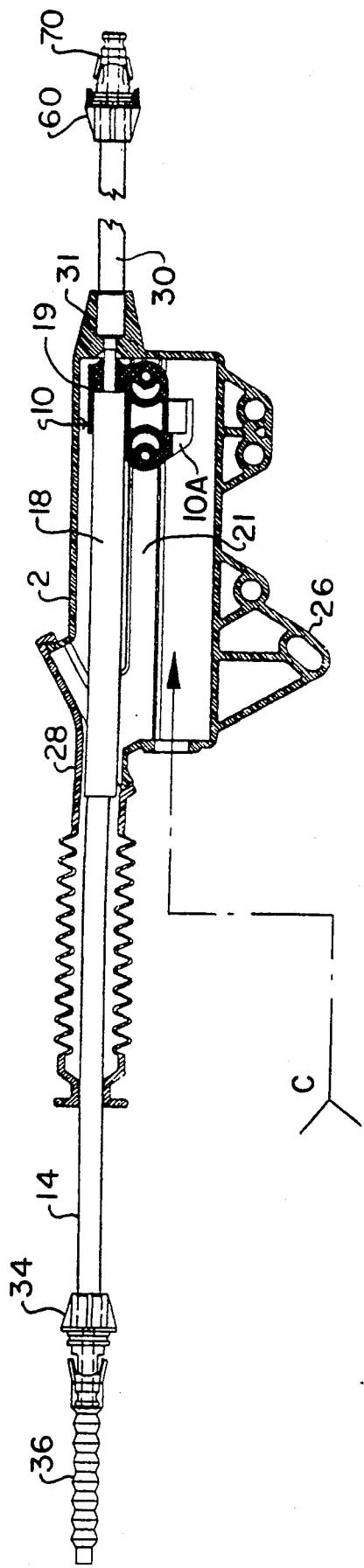
FIG. 8 is a side view, partially in cross-section, of the control cable subassembly after insertion into the module housing subassembly.
Figure 9:
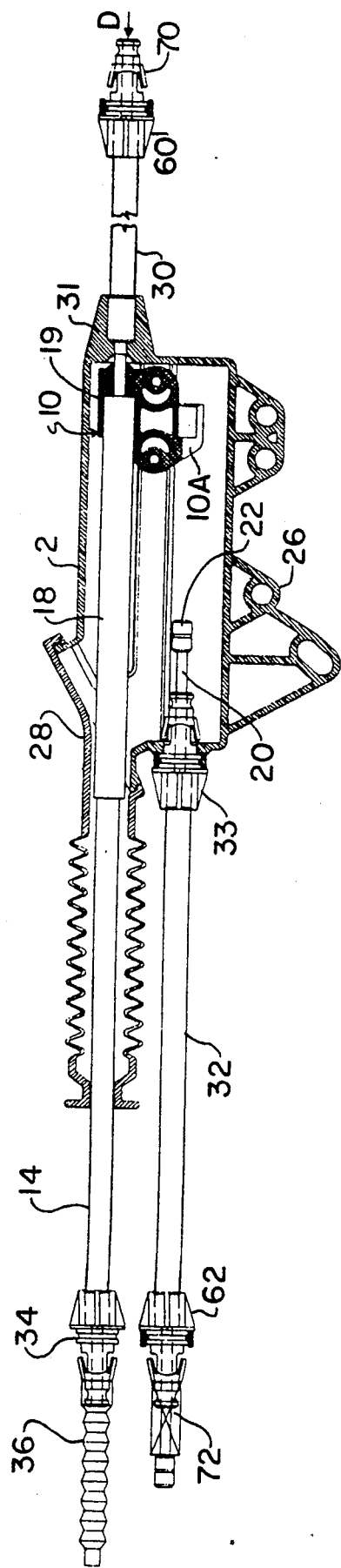
FIG. 9 is a side view, partially in cross-section, of the actuating cable subassembly after insertion into the module housing subassembly.
Figure 10:
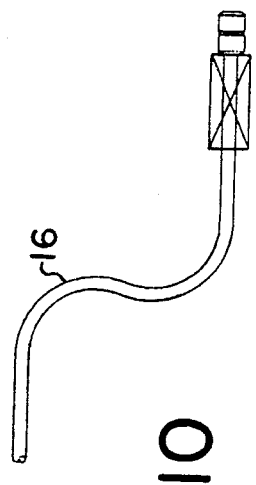
FIG. 10 is a side view of the strand end of the actuating cable the present invention.

The actuating cable subassembly 300 is then snapped into the module housing subassembly 200 as shown in FIG. 8 by insertion therein in the direction of arrow C. The second control cable conduit 32 is attached to an opening in the housing 2 by a second conduit fitting 33 generally on the same side of the housing 2 a the guide tube 18. The second control cable strand 20 can slide within the second control conduit 32. FIG. 9 illustrates the assembly obtained after the completion of this step. Strand 16 can then extend beyond the end of end fitting 60 for connection or attachment to the first vehicle brake.

Figure 11:
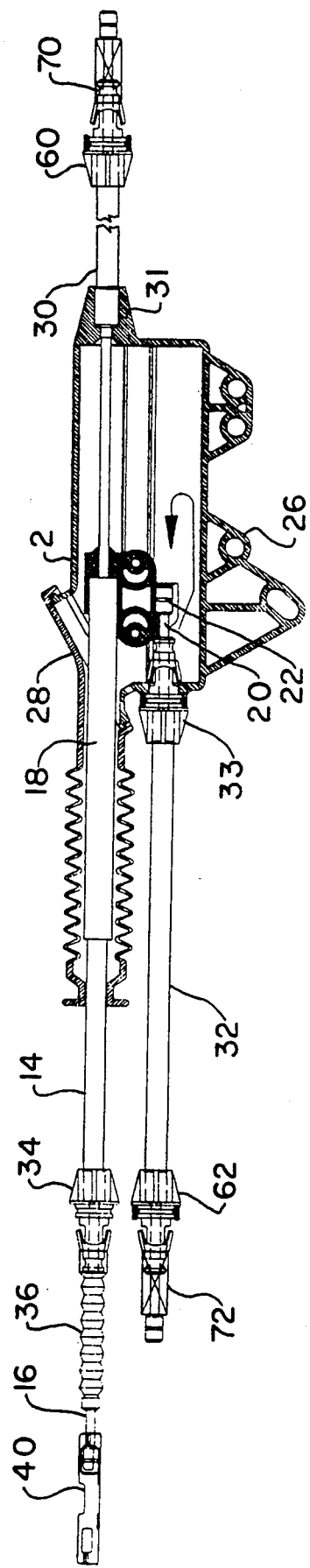
FIG. 11 is a side view, partially in cross-section, of the assembled actuating cable subassembly, control cable subassembly and module housing subassembly.
Figure 12:
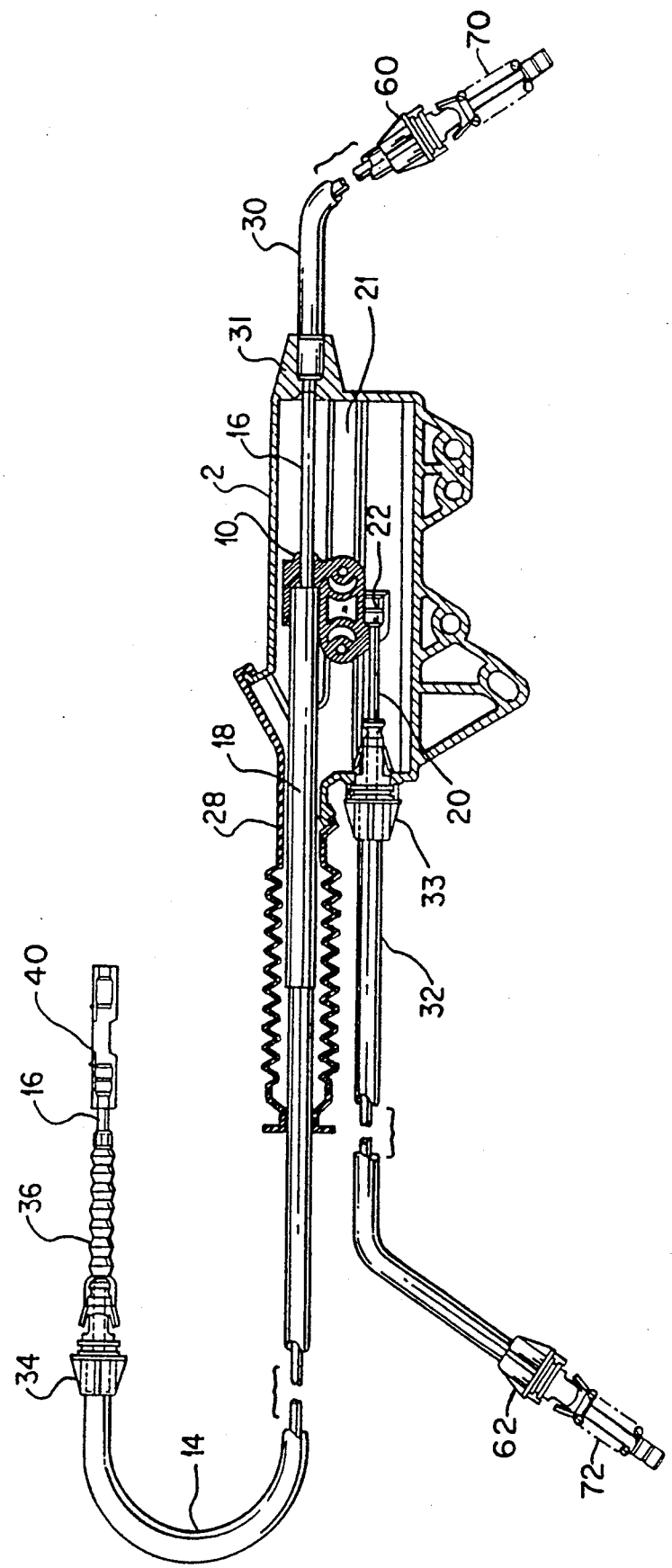
FIG. 12 is a schematic view, partially in cross section, of the overall assembly of the modular brake system of the invention.

Finally, the assembly is completed by placing the reactive slide member 10 at the extreme left side of the housing 2, while compressing the spring on the actuating cable, to extend the strand end past the reactive slide member 10. Thus, the end of strand 20 and, in particular, button 22, can be connected to reactive slide member 10. As shown in FIG. 11, the cable end button 22 is guided into the cast recess 24 of the reactive slide member 10 by the geometry of the housing, and nests therein. Also, the opposite end of the actuating cable strand is connected to the second vehicle brake to complete the assembly. The final assembly is illustrated in FIG. 12.

The operation of the assembly is described in application Ser. No. 07/822,801, and is briefly described herein. When the reactive slide member 10 slides within the housing 2 as a result of the actuator and control conduit providing movement in the direction of arrow A in response to a compressive force, the second control cable strand 20 is likewise pulled in the same direction and the actuator strand 6 is pulled to the opposite direction by the action of the hand or foot brake actuator. The compressive load on reactive slide 10 by the actuator and control cable conduit 14 results from the strand 16 being pulled by the brake actuator. Thus, the forces applied to the hand or foot brake are transmitted to the first and second brakes.

It is anticipated that there are various suitable materials for the fabrication of this modular brake system. To achieve a durable watertight housing, it is anticipated that a moldable glass reinforced nylon be used to fabricate the housing to provide the appropriate strength and corrosion resistance. The reactive slide 10 may be made from die cast zinc with a nickel plating for added wear protection. This coating also reduces the coefficient of friction. The molded boots may be made of suitable flexible and durable materials, such as injection molded EPDM or Santoprene rubber.

To accommodate various vehicle chassis lengths, it is desirable to be able to alter the length of the actuator and control cable 14. To accomplish this objective, the end of the actuator and control conduit 14 opposite its connection to reactive slide member 10 may be provided with a first conduit fitting 34. A snap-on assembly 36 that encloses and seals the control strand 16 is attached to the conduit fitting 34, and a retaining clip 40 is attached to the end of strand 16. To this clip 40 may be attached to a jumper strand assembly of the desired length as explained in copending application Ser. No. 07/882,801. Thus, the length of the control cable 14 can be altered as desired during installation by selection of the appropriate length of the jumper strand.

A second flexible boot may be attached to the extended portion of the control cable conduit 14 to seal the strand 16. Also, means can be provided to secure conduit 14, conduit 30 or conduit 32 to the vehicle, such means being conveniently provided by placing a grommet along an outer portion of those conduits.

The modular brake as described provides an efficient and compact assembly that is easy to assemble, corrosion resistant and which may be installed in vehicles of varying chassis length. It is understood that the invention as disclosed is representative of various embodiments and that the components and their arrangement may be altered by those skilled in the art without diminishing the scope of this invention.

What is claimed is:

1. A method for assembling a modular brake system on a vehicle which comprises:
   preparing a reactive slide member having means to facilitate reciprocal movement and a bore therein for receiving a cable strand;
   operatively associating a first cable conduit having a first cable strand disposed therein with the reactive slide member such that the first cable strand can slidably move through the conduit and reactive slide member;
   preparing a housing having inner walls which define a cavity, an opening for receiving the slide member, openings for allowing cable strands to enter or exit the cavity and means on the inner walls for receiving the reciprocal movement means of the reactive slide member;
   affixing a second cable conduit to one of the openings of the housing for receiving a cable strand which exits the housing cavity through that opening;
   preparing a third cable conduit having a third cable strand slidably disposed therein;
   placing the reactive slide member into the housing through its respective housing opening;
   passing a first end of the first cable strand from the reactive slide member through a housing opening and into the second cable conduit;
   attaching a first end of the third cable strand to the reactive slide member; and
   configuring the first end of the first cable strand and a second end of the third cable strand for transmitting forces to first and second vehicle brakes, respectively.

2. The method of claim 1 wherein one end of the first cable conduit is attached to the reactive slide member to form an actuating cable subassembly prior to placing the reactive slide member into the housing.

3. The method of claim 1 which further comprises providing the reactive slide member with means for guiding the first cable conduit thereto.

4. The method of claim 1 wherein one end of the second cable conduit is attached to the housing to form a modular housing subassembly prior to placing the reactive slide member therein.

5. The method of claim 1 which further comprises configuring the openings of the housing so that the first and second cable strands are in parallel alignment.

6. The method of claim 1 which further comprises providing an end button on the first end of the second cable strand, providing a recess in the reactive slide for receiving the end button of the second cable strand and configuring the geometry of the housing to direct the end button into the recess as it passes into the housing.

7. The method of claim 1 which further comprises sealing the first cable conduit to the housing to prevent entry of contaminants.

8. The method of claim 1 which further comprises attaching the first end of the first cable strand and the second end of the third cable strand to the first and second vehicle brakes, respectively.

9. The method of claim 1 which further comprises providing one or more jumper strands for connection to either the first end of the first cable strand or the second end of the third cable strand, or both, for adjusting the length of such strands prior to connection to the first and second vehicle brakes, respectively.

10. The method of claim 1 which further comprises attaching one or more of the first, second and third cable conduits to the vehicle.

11. The method of claim 1 which further comprises attaching the housing to the vehicle.

12. A method for assembling a modular brake system on a vehicle which comprises:
   forming an actuating cable subassembly by preparing a reactive slide member having pin means and a bore therein for receiving a cable strand, and affixing to the reactive slide member a first cable conduit having a first cable strand disposed within for slidable movement through the conduit and reactive slide member;
   forming a modular housing subassembly by preparing a housing having inner walls which define a cavity, an opening for receiving the slide member of the actuating cable subassembly, openings for allowing cable strands to enter or exit the cavity and channels on the inner walls for slidably receiving the pin means of the reactive slide member, and affixing a second cable conduit to one of the openings of the housing for receiving a cable strand which exits the housing cavity through that opening;
   preparing a control cable subassembly of a third cable conduit having a third cable strand slidably disposed therein;
   placing the reactive slide member of the actuating cable subassembly into the modular housing subassembly through its respective housing opening;
   passing a first end of the first cable strand from the reactive slide member through a housing opening and into the second cable conduit;
   attaching a first end of the third cable strand to the reactive slide member; and
   configuring the first end of the first cable strand and a second end of the second cable strand for connection to first and second vehicle brakes, respectively.

13. The method of claim 12 which further comprises providing the reactive slide member with means for guiding the first cable conduit thereto.

14. The method of claim 13 which further comprises configuring the openings of the housing so that the first and second cable strands are in parallel alignment.

15. The method of claim 14 which further comprises providing an end button on the first end of the second cable strand, providing a recess in the reactive slide for receiving the end button of the second cable strand and configuring the geometry of the housing to direct the end button of the second cable strand into the recess as it passes into the housing.

16. The method of claim 15 which further comprises sealing the first cable conduit to the housing to prevent entry of contaminants into the housing cavity.

17. The method of claim 12 which further comprises the first end of the first cable strand and the second end of the third cable strand to the first and second vehicle brakes, respectively.

18. The method of claim 12 which further comprises providing one or more jumper strands for connection to either the first end of the first cable strand or the second end of the third cable strand, or both, for adjusting the length of such strands prior to connection to the first and second vehicle brakes, respectively.

19. The method of claim 16 which further comprises attaching one or more of the first, second and third cable conduits to the vehicle.

20. The method of claim 19 which further comprises attaching the housing to the vehicle.

21. A modular brake system provided by the method of any one of claims 1 or 12.

22. A modular brake system for a vehicle which comprises:
   a reactive slide member having means to facilitate reciprocal movement and a bore therein for receiving a cable strand;
   a first cable conduit having a first cable strand disposed therein and operatively associated with the reactive slide member such that the first cable strand can slidably move through the conduit and reactive slide member;
   a housing having inner walls which define a cavity, an opening for receiving the slide member, openings for allowing cable strands to enter or exit the cavity and means on the inner walls for receiving the reciprocal movement means of the reactive slide member;
   a second cable conduit affixed to one of the openings of the housing for receiving a cable strand which exits the housing cavity through that opening;
   a third cable conduit having a third cable strand slidably disposed therein with a first end of the third cable strand attached to the reactive slide member;
   wherein a first end of the first cable strand extends from the reactive slide member out of the housing through a housing opening and into the second cable conduit, and the first end of the first cable strand and a second end of the third cable strand are configured for transmitting forces to first and second vehicle brakes, respectively.

23. The system of claim 22 wherein the reactive slide member includes means for guiding the first cable conduit thereinto, and the second cable conduit is affixed to an aperture in the housing.

24. The system of claim 23 wherein the openings of the housing are configured so that the first and second cable strands are in parallel alignment.

25. The system of claim 24 wherein the first end of the second cable strand includes an end button, the reactive slide includes a recess for receiving the end button of the second cable strand and the geometry of the housing is configured to direct the end button of the second cable strand into the recess as it passes into the housing.

26. The system of claim 25 which further comprises sealing the first cable conduit to the housing to prevent entry of contaminants into the housing cavity.

27. The system of claim 26 which further comprises one or more jumper strands for connecting either the first end of the first cable strand or the second end of the third cable strand, or both, to the first and second vehicle brakes, respectively, for adjusting the length of such strands prior to connection.

28. The system of claim 27 wherein one or more of the first, second and third cable conduits to the vehicle includes means for attachment to the vehicle.

29. The system of claim 28 which further comprises means for attaching the housing to the vehicle.

30. The system of claim 29 wherein the first end of the first cable strand and the second end of the third cable strand are connected to the first and second vehicle brakes, respectively.

* * * * *